(12) United States Patent
Inoue et al.

(10) Patent No.: US 10,377,241 B2
(45) Date of Patent: Aug. 13, 2019

(54) SPEED CONTROL DEVICE OF ELECTROMOTIVE VEHICLE

(71) Applicant: PANASONIC INTELLECTUAL PROPERTY MANAGEMENT CO., LTD., Osaka (JP)

(72) Inventors: Shuji Inoue, Osaka (JP); Shinji Masuda, Osaka (JP); Ryouji Oonishi, Osaka (JP); Hajime Homma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 19 days.

(21) Appl. No.: 15/688,046

(22) Filed: Aug. 28, 2017

(65) Prior Publication Data

US 2017/0355266 A1 Dec. 14, 2017

Related U.S. Application Data

(63) Continuation of application No. PCT/JP2016/003009, filed on Jun. 22, 2016.

(30) Foreign Application Priority Data

Dec. 21, 2015 (JP) .................................. 2015-248161

(51) Int. Cl.
  *B60T 8/32* (2006.01)
  *G05D 1/00* (2006.01)
  (Continued)

(52) U.S. Cl.
  CPC ........ *B60L 7/14* (2013.01); *B60L 7/26* (2013.01); *B60L 15/2009* (2013.01);
  (Continued)

(58) Field of Classification Search
  None
  See application file for complete search history.

(56) References Cited

U.S. PATENT DOCUMENTS

| 5,615,933 A * 4/1997 Kidston .................. B60L 3/102 |
| | 180/65.1 |
| 5,839,800 A * 11/1998 Koga ....................... B60K 6/46 |
| | 303/152 |

(Continued)

FOREIGN PATENT DOCUMENTS

| EP | 3251906 A1 | 12/2017 |
| JP | 08-163707 | 6/1996 |

(Continued)

OTHER PUBLICATIONS

International Search Report (ISR) from International Searching Authority (Japan Patent Office) in International Pat. Appl. No. PCT/JP2016/003009, dated Aug. 2, 2016.

(Continued)

*Primary Examiner* — Bhavesh V Amin
(74) *Attorney, Agent, or Firm* — Greenblum & Bernstein, P.L.C.

(57) ABSTRACT

Includes electric motor (330) driving driving wheel (610), speed control unit (300) controlling driving of electric motor (330) based on instructed speed $\omega_r^*$, brake control unit (400) controlling hydraulic brake (500) applying mechanical braking to an electromotive vehicle, speed sensor (340) detecting traveling speed $\omega_r$ of the electromotive vehicle, and determination unit (200) determining whether the mechanical braking needs to be applied in response to the difference between instructed speed $\omega_r^*$ and traveling speed $\omega_r$, and controlling operation of brake control unit (400) based on the determination result. Determination unit (200) determines that mechanical braking needs to be applied when instructed speed $\omega_r^*$ indicates deceleration and traveling speed $\omega_r$ is higher than instructed speed $\omega_r^*$, and performs control so that brake control unit (400) works hydraulic brake (500).

9 Claims, 15 Drawing Sheets

(51) Int. Cl.
*G06F 7/00* (2006.01)
*G06F 17/00* (2019.01)
*B60L 7/14* (2006.01)
*B60T 7/12* (2006.01)
*B60T 8/17* (2006.01)
*B60L 7/26* (2006.01)
*B60W 10/188* (2012.01)
*B60W 30/14* (2006.01)
*B60L 15/20* (2006.01)

(52) U.S. Cl.
CPC ....... *B60L 15/2018* (2013.01); *B60L 15/2027* (2013.01); *B60L 15/2072* (2013.01); *B60L 15/2081* (2013.01); *B60T 7/12* (2013.01); *B60T 8/17* (2013.01); *B60W 10/188* (2013.01); *B60W 30/146* (2013.01); *B60L 2240/12* (2013.01); *B60L 2240/421* (2013.01); *B60L 2240/423* (2013.01); *B60W 2710/182* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 5,961,559 | A | 10/1999 | Shimbara et al. | |
| 6,286,635 | B1* | 9/2001 | Tamor | B60L 7/26 180/65.21 |
| 6,457,784 | B1* | 10/2002 | Bohm | B60K 6/48 303/155 |
| 6,648,423 | B1* | 11/2003 | Klein | B60T 7/12 180/170 |
| 6,655,754 | B2* | 12/2003 | Crombez | B60L 7/26 188/156 |
| 6,663,197 | B2* | 12/2003 | Joyce | B60L 7/26 188/156 |
| 6,729,698 | B2* | 5/2004 | Kusano | B60T 8/34 188/352 |
| 6,862,511 | B1* | 3/2005 | Phillips | B60K 5/08 701/54 |
| 7,150,508 | B2* | 12/2006 | Ganzel | B60T 8/3655 303/113.4 |
| 7,252,346 | B2* | 8/2007 | Higuchi | B60T 8/1755 303/113.1 |
| 7,922,265 | B1* | 4/2011 | Cottrell | B60T 1/10 303/113.1 |
| 8,265,850 | B2* | 9/2012 | Shin | B60W 10/06 701/93 |
| 8,855,844 | B2* | 10/2014 | Schwindt | B60K 31/0008 701/22 |
| 2002/0183902 | A1* | 12/2002 | Koerner | B60T 8/36 701/33.9 |
| 2003/0080614 | A1* | 5/2003 | Soga | B60K 6/44 303/152 |
| 2003/0090149 | A1* | 5/2003 | Kusano | B60T 8/34 303/191 |
| 2004/0181323 | A1* | 9/2004 | Yuan | B60L 15/2045 701/22 |
| 2004/0222762 | A1* | 11/2004 | Maslov | B60L 15/02 318/437 |
| 2005/0143878 | A1* | 6/2005 | Park | B60K 6/48 701/22 |
| 2005/0275285 | A1* | 12/2005 | Higuchi | B60T 8/1755 303/146 |
| 2006/0212207 | A1* | 9/2006 | Sugano | B60W 10/06 701/93 |
| 2007/0284936 | A1* | 12/2007 | Maki | B60K 6/445 303/15 |
| 2008/0318728 | A1* | 12/2008 | Soliman | B60K 6/445 477/4 |
| 2009/0025996 | A1* | 1/2009 | Inoue | B60K 31/0066 180/179 |
| 2009/0132138 | A1* | 5/2009 | Yasuhito | B60K 31/02 701/70 |
| 2009/0259354 | A1* | 10/2009 | Krupadanam | B60W 10/06 701/22 |
| 2010/0198450 | A1* | 8/2010 | Shin | B60W 30/14 701/31.4 |
| 2010/0198478 | A1* | 8/2010 | Shin | B60W 10/06 701/96 |
| 2017/0008400 | A1* | 1/2017 | Katsuta | B60L 3/0015 |
| 2018/0015925 | A1 | 1/2018 | Komatsu et al. | |

FOREIGN PATENT DOCUMENTS

| | | |
|---|---|---|
| JP | 10-051903 | 2/1998 |
| JP | 2000-197205 | 7/2000 |
| JP | 2013-244838 A | 12/2013 |
| JP | 2014-136441 | 7/2014 |
| WO | 2015/114430 A1 | 8/2015 |

OTHER PUBLICATIONS

The Extended European Search Report from the European Patent Office (EPO) dated Apr. 20, 2018 for the related European Patent Application No. 16877916.3.

* cited by examiner

SPEED CONTROL DEVICE OF ELECTROMOTIVE VEHICLE

CROSS-REFERENCE TO RELATED APPLICATIONS

This application is a Continuation of International Patent Application No. PCT/JP2016/003009 filed Jun. 22, 2016, which claims priority of Japan Application No. JP 2015-248161 filed Dec. 21, 2015. Moreover, the disclosure of International Patent Application No. PCT/JP2016/003009 is expressly incorporated by reference herein in its entirety.

TECHNICAL FIELD

The present disclosure relates to a speed control device of an electromotive vehicle.

BACKGROUND ART

There have been known the technologies described in PTLs 1 and 2 as a speed control device of an electromotive vehicle.

PTL 1 discloses an automatic guided vehicle that moves according to instructions from its upper controller. The vehicle performs speed feedback control according to instructions from its upper controller. The vehicle is equipped with a counterrotating brake that exerts counterrotating torque on the electric motor.

PTL 2 discloses a method of collaboration between a regenerative brake and a mechanical brake in what is called a hybrid car, where an electric motor and an engine coexist. In PTL 2, a regenerative brake is applied in response to the travel of the pedal according to a rule and the deceleration is measured with an acceleration sensor. When the measurement result indicates that the regenerative brake does not generate a sufficient braking force, the mechanical brake compensates for the deficit.

CITATION LIST

Patent Literature

PTL 1: Japanese Patent Unexamined Publication No. H10-51903
PTL 2: Japanese Patent Unexamined Publication No. H08-163707

SUMMARY

The present disclosure provides a speed control device of an electromotive vehicle that has better performance of traveling speed following instructed speed.

A speed control device of an electromotive vehicle according to the disclosure includes an electric motor that drives driving wheels, a speed control unit that controls driving of the electric motor according to instructed speed, a brake control unit that controls a hydraulic brake applying a mechanical braking force to the electromotive vehicle, a speed detecting unit that detects traveling speed of the electromotive vehicle, and a determination unit that determines whether mechanical braking is needed according to the difference between the instructed speed and the traveling speed and controls operation of the brake control unit according to the determination result.

The disclosure provides a speed control device of an electromotive vehicle that has better performance of traveling speed following instructed speed.

DESCRIPTION OF EMBODIMENTS

Background of the Present Disclosure

An electromotive vehicle allows its travel to be controlled by adjusting travel torque and brake torque, in the same way as a vehicle operated by a person. Travel torque causes an electromotive vehicle to accelerate and decelerate by controlling the electric motor for travelling. Brake torque causes an electromotive vehicle to decelerate and stop by controlling the hydraulic pressure adjusting unit that operates hydraulic equipment for working the hydraulic brake of an electromotive vehicle. In a vehicle driven by a person, travel torque corresponds to an extent to which a gas pedal is pressed; brake torque corresponds to an extent to which a brake pedal is pressed.

A smaller travel torque for decelerating a vehicle causes the electric motor to operate due to an inertial force, and the motor works as a power generator. If the system is configured so that generated power voltage charges a storage battery, decelerating torque occurs in the electric motor, which is typically called a regenerative brake. It is, however, well known that when a vehicle lowers its speed, the rotation speed of the electric motor decreases, which drops the generated power voltage to reduce the possibility of providing an effective braking force.

There is known a technique in which a regenerative brake is used when the speed of the vehicle is higher than a threshold (certain speed) and a counterrotating brake is used when the speed of the vehicle is lower than the threshold to improve the performance of following instructed speed in deceleration. However, changing from the regenerative brake to the counterrotating brake may cause a shock, albeit slight, which is undesirable for a passenger vehicle. In addition, after changed to the counterrotating brake, energy cannot be collected by regeneration. Under such circumstances, the present disclosure provides a speed control device of an electromotive vehicle with better performance of traveling speed following instructed speed through collaboration of a regenerative brake and a hydraulic brake according to the difference between instructed speed and traveling speed.

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that accompanying drawings and the following description are provided for those skilled in the art to well understand the disclosure and these are not intended to limit the subjects described in the claims by the drawings and the description.

Hereinafter, the first through third exemplary embodiments are described using FIGS. 1 through 15.

First Exemplary Embodiment

1. Configuration 1-1. Configuration

Figure 1:
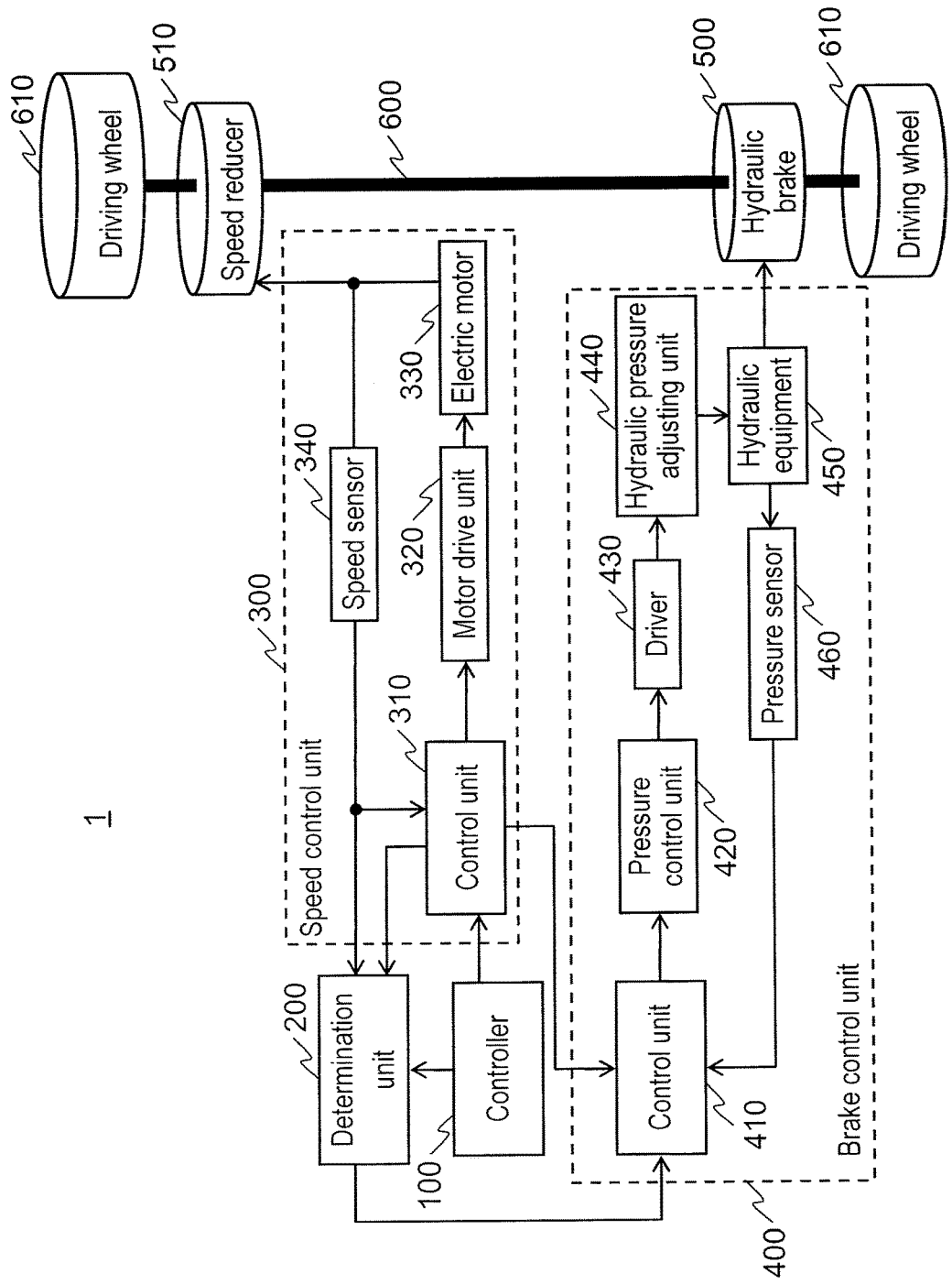
FIG. 1 is a block diagram illustrating a configuration example of a speed control device of an electromotive vehicle according to the first exemplary embodiment.

FIG. 1 is a block diagram illustrating a configuration example of speed control device 1 of an electromotive vehicle according to the first exemplary embodiment.

As shown in FIG. 1, speed control device 1 according to the first embodiment includes controller 100, determination unit 200, speed control unit 300, brake control unit 400, and hydraulic brake 500. FIG. 1 illustrates speed reducer 510, driving shaft 600, and driving wheel 610 for purposes of description.

Controller 100 outputs instructed speed to control unit 310 and determination unit 200. Determination unit 200 calculate the difference between instructed speed output from controller 100 and traveling speed of the electromotive vehicle detected by speed sensor 340. Determination unit 200 determines whether only the braking force due to decelerating torque (the regenerative brake) generated in electric motor 330 sufficiently decelerates to instructed speed in response to the difference (a speed error) calculated. In other words, determination unit 200 determines whether applying mechanical braking is required. Determination unit 200 controls operation of brake control unit 400 according to the determination result.

Speed control unit 300 controls speed of an electromotive vehicle according to instructed speed output from controller 100. Speed control unit 300 includes control unit 310, motor drive unit 320, electric motor 330, and speed sensor 340.

Control unit 310 calculates a speed error between instructed speed output from controller 100 and traveling speed of the electromotive vehicle detected by speed sensor 340. Control unit 310 generates a control signal for controlling electric motor 330 according to a speed error and outputs the signal to motor drive unit 320. Control unit 310 also outputs the speed error to brake control unit 400.

Motor drive unit 320 carries out a given conversion to a current supplied from a power supply (not shown) according to the control signal generated by control unit 310, and supplies a desired current to electric motor 330. Electric motor 330 generates a driving force by means of the current supplied from motor drive unit 320, and transmits the driving force to two driving wheels 610 through speed reducer 510 and driving shaft 600. Driving wheel 610 rotated by the driving force causes the electromotive to travel. During deceleration, decelerating torque occurs in electric motor 330 to work the regenerative brake. Speed sensor 340 detects the rotation speed of electric motor 330, detects the traveling speed of the electromotive vehicle according to the detection result, and outputs the traveling speed to control unit 310 and determination unit 200.

Brake control unit 400 controls operation of hydraulic brake 500 according to the determination result by determination unit 200. In other words, brake control unit 400 applies mechanical braking to the electromotive vehicle according to the determination result by determination unit 200. Brake control unit 400 includes control unit 410, pressure control unit 420, driver 430, hydraulic pressure adjusting unit 440, hydraulic equipment 450, and pressure sensor 460.

Control unit 410 controls pressure control unit 420 according to the determination result output from determination unit 200. Control unit 410 determines an instructed pressure from the speed error output from control unit 310 of speed control unit 300. Control unit 410 calculates a pressure error from the instructed pressure and an actual pressure value measured by pressure sensor 460.

Pressure control unit 420 calculates a control amount for hydraulic brake 500 according to the pressure error calculated by control unit 410. Driver 430 controls operation of hydraulic equipment 450 through hydraulic pressure adjusting unit 440, according to the control amount calculated by pressure control unit 420. Hydraulic pressure adjusting unit 440 rotates according to control by driver 430. Hydraulic equipment 450 supplies a driving hydraulic pressure to hydraulic brake 500 according to the rotation of hydraulic pressure adjusting unit 440. Hydraulic brake 500 applies mechanical braking to the electromotive vehicle to decelerate and to stop the electromotive vehicle. Pressure sensor 460 measures an actual pressure value and outputs it to control unit 410.

1-2. Operation

Speed control unit 1 according to the first embodiment feedback-controls traveling speed measured by speed sensor 340 to make the traveling speed follow instructed speed. Here, the rotation speed of electric motor 330 and that of driving wheel 610 are assumed to have a constant relationship to each other. Hence, speed control unit 1 controls the rotation speed of electric motor 330 to control the rotation speed of driving wheel 610, namely the traveling speed of the electromotive vehicle.

1-2-1. Mechanical Braking

Figure 2:
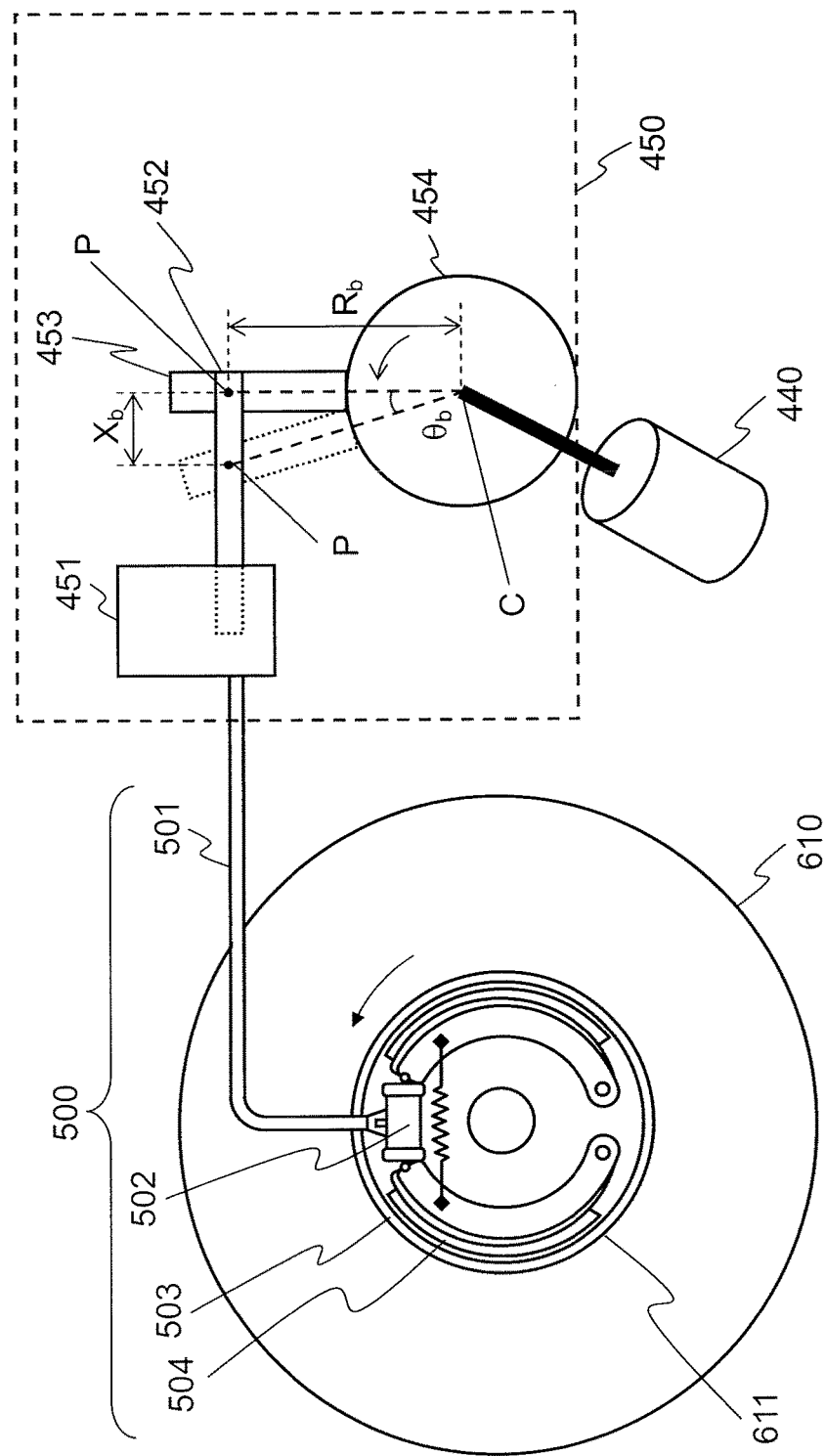
FIG. 2 illustrates mechanical braking of the speed control device according to the first embodiment.

FIG. 2 illustrates mechanical braking in the first embodiment.

In FIG. 2, hydraulic equipment 450 includes master cylinder 451, push rod 452, lever 453, and rotation shaft 454.

Hydraulic brake 500 includes brake pipe 501; and wheel cylinder 502, brake drum 503, and brake shoe 504, inside wheel 611 of driving wheel 610.

Hydraulic pressure adjusting unit 440 rotates according to control by driver 430. Lever 453 attached to rotation shaft 454 of hydraulic equipment 450 rotates in response to the rotation of hydraulic pressure adjusting unit 440 to push rod 452, which is connected to a hydraulic piston called master cylinder 451. Push rod 452 pushes master cylinder 451 to generate a hydraulic pressure in master cylinder 451.

Brake pipe 501 is installed in the area from master cylinder 451 through wheel cylinder 502 provided inside wheel 611 of driving wheel 610. The inside of brake pipe 501 is filled with dedicated brake fluid, and a hydraulic pressure generated is uniformly transmitted to the end of brake pipe 501. Wheel cylinder 502 uses the hydraulic pressure of brake pipe 501 to work brake shoe 504. Brake shoe 504 presses brake drum 503 to apply mechanical braking to driving wheel 610.

1-2-2. Modeling of Control System for Mechanical Braking

The control system for mechanical braking is modeled for description.

First, brake operation is described.

As shown in FIG. 2, lever 453 rotates in response to the rotation of hydraulic pressure adjusting unit 440 to pushes rod 452. The distance from center C of rotation shaft 454 to connecting point P connected with push rod 452 is $R_b$ [m]; the rotation angle of hydraulic pressure adjusting unit 440 (rotation shaft 454) is $\theta_b$ [rad]; and the moving distance of push rod 452 is $X_b$ [m]. For small $\theta_b$, $X_b$ is expressed by expression 1.

$$X_b = R_b \cdot \tan \theta_b \approx R_b \cdot \theta_b \quad \text{[Expression 1]}$$

Here, moving distance $X_b$ of push rod 452 is typically proportional to brake pressure $P_b$ [/m²] generated by master cylinder 451. Hence, brake pressure $P_b$ is expressed by expression 2, where the factor of proportionality is $a_1$.

$$P_b = a_1 \cdot X_b \quad \text{[Expression 2]}$$

Further, brake pressure $P_b$ is proportional to brake torque $T_b$ [N·m] becoming a braking force. Brake torque $T_b$ is expressed by expression 3, where the factor of proportionality is $a_b$.

$$T_b = a_b \cdot P_b \quad \text{[Expression 3]}$$

From expressions 1 through 3, brake torque $T_b$ is expressed by expression 4.

$$T_b = a_b \cdot (a_1 \cdot X_b) = a_b \cdot a_1 \cdot R_b \cdot \theta_b \quad \text{[Expression 4]}$$

As shown by expression 4, rotation angle $\theta_b$ of hydraulic pressure adjusting unit 440 is linear with brake torque $T_b$. Brake pressure $P_b$ increases proportionally to the rotation of hydraulic pressure adjusting unit 440, becoming disturbance torque that interferes with the rotation of hydraulic equipment 450. From expression 3, disturbance torque $T_{db}$ [N·m] is expressed by expression 5.

$$T_{db} = a_2 \cdot P_b \quad \text{[Expression 5]}$$

As shown by expression 5, when rotation torque $T_{qb}$ of hydraulic pressure adjusting unit 440 balances with disturbance torque $T_{db}$ due to a hydraulic pressure, angular velocity $\omega_b$ of hydraulic pressure adjusting unit 440 is zero, and hydraulic pressure adjusting unit 440 stops.

Figure 3:
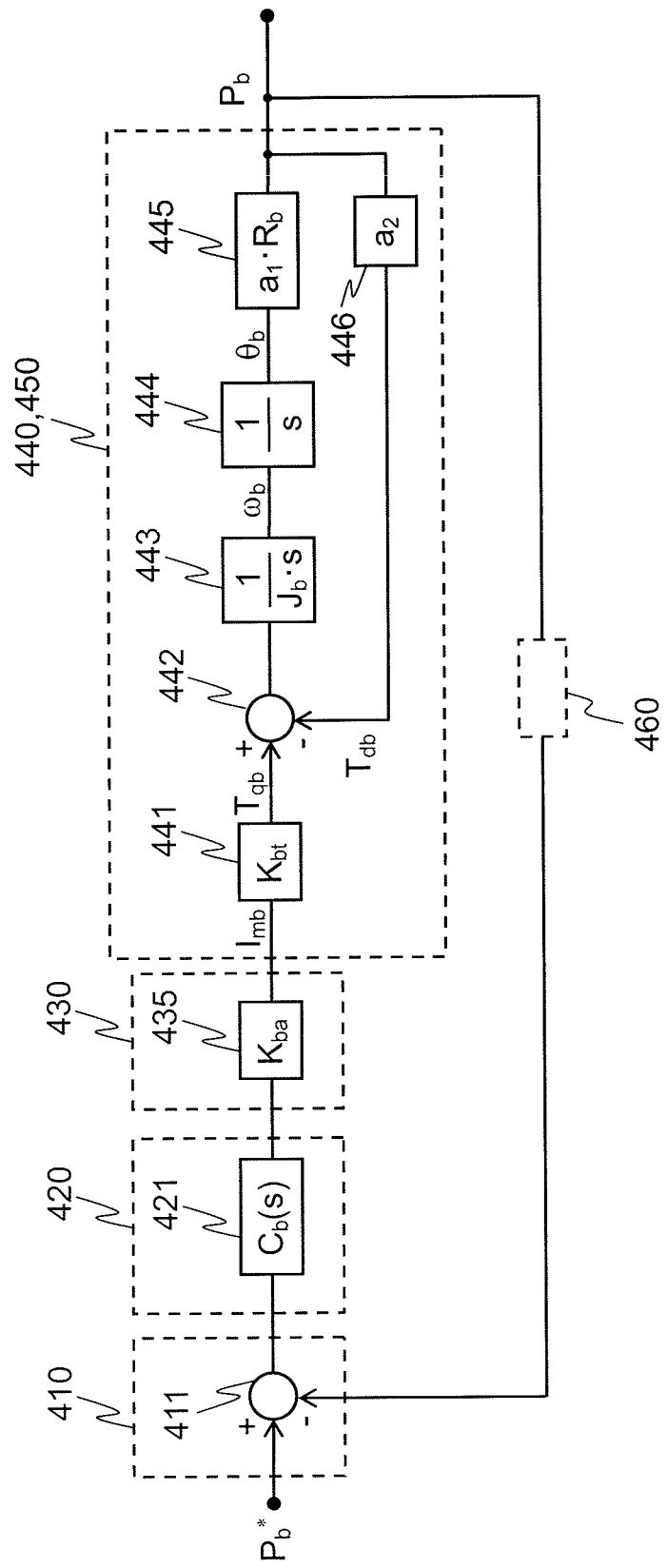
FIG. 3 shows a modeled control system for mechanical braking of the speed control device according to the first embodiment.

Next, a control system for mechanical braking is modeled. FIG. 3 shows a modeled control system for mechanical braking in the first embodiment.

Here, the respective parameters in FIG. 3 are as follows.
$P_b^*$: instructed brake pressure [N/m²]
$C_b(s)$: pressure control process by pressure control unit 420

$K_{ba}$: gain of driver 430
$K_{bt}$: torque constant of hydraulic pressure adjusting unit 440
$J_b$: inertia moment of hydraulic pressure adjusting unit 440
$\omega_b$: rotation angular velocity [rad/s] of hydraulic pressure adjusting unit 440
$\theta_b$: rotation angle [rad] of hydraulic pressure adjusting unit 440

Adder 411, corresponding to control unit 410 in FIG. 1, calculates a pressure error from instructed brake pressure $P_b^*$[N/m²] and an actual pressure value measured by pressure sensor 460. Arithmetic unit 421, corresponding to pressure control unit 420 in FIG. 1, performs computation by $C_b(s)$ to the pressure error. Arithmetic unit 435, corresponding to driver 430 in FIG. 1, calculates current value $I_{mb}$ [A] from the computation result by arithmetic unit 421 and gain $K_{ba}$ of driver 430.

In hydraulic pressure adjusting unit 440 and hydraulic equipment 450 in FIG. 1, arithmetic unit 441 calculates brake torque $T_{qb}$ of hydraulic pressure adjusting unit 440 from current value $I_{mb}$ and torque constant $K_{bt}$. Adder 442 calculates the difference between brake torque $T_{qb}$ and disturbance torque $T_{db}$. Arithmetic unit 443 Laplace-transforms the error calculated by adder 442 and inertia moment $J_b$ of hydraulic pressure adjusting unit 440 to calculate rotation angular velocity $\omega_b$ of hydraulic pressure adjusting unit 440. Arithmetic unit 444 calculates rotation angle $\theta_b$ of hydraulic pressure adjusting unit 440 from rotation angular velocity $\omega_b$. Arithmetic unit 445 calculates brake pressure $P_b$ from rotation angle $\theta_b$. From expressions 1 and 2, brake pressure $P_b$ is $P_b = a_1 \cdot R_b \cdot \theta_b$. Arithmetic unit 446 calculates disturbance torque $T_{db}$ using expression 5.

From FIG. 3, the transfer function from instructed brake pressure $P_b^*$ to brake pressure $P_b$ is derived as expression 6.

$$P_b = \frac{\frac{1}{J_b} \cdot R_b \cdot a_1 \cdot K_{ba} \cdot K_{bt} \cdot C_b(s)}{s^2 + \frac{1}{J_b} \cdot R_b \cdot a_1 \cdot K_{ba} \cdot K_{bt} \cdot C_b(s) + \frac{1}{J_b} \cdot R_b \cdot a_1 \cdot a_2} \cdot P_b^* \quad \text{[Expression 6]}$$

Here, to control response from an actual pressure, $C_b(s)$ that makes the denominator of expression 6 be expression 7 becomes expression 8.

$$s^2 + \frac{1}{J_b} \cdot R_b \cdot a_1 \cdot K_{ba} \cdot K_{bt} \cdot C_b(s) + \frac{1}{J_b} \cdot R_b \cdot a_1 \cdot a_2 = s^2 + 2\zeta \cdot \omega_n \cdot s + \omega_n^2 \quad \text{[Expression 7]}$$

$$C_b(s) = \frac{2\zeta \cdot \omega_n \cdot s + \omega_n^2 - \frac{1}{J_b} \cdot R_b \cdot a_1 \cdot a_2}{\frac{1}{J_b} \cdot R_b \cdot a_1 \cdot K_{ba} \cdot K_{bt}}$$

$$= \frac{J_b \cdot \omega_n^2 - R_b \cdot a_1 \cdot a_2}{R_b \cdot a_1 \cdot K_{ba} \cdot K_{bt}} + \frac{2J_b \cdot \zeta \cdot \omega_n}{R_b \cdot a_1 \cdot K_{ba} \cdot K_{bt}} \cdot s \quad \text{[Expression 8]}$$

In expressions 7 and 8, $\zeta$ is a damping factor and $\omega_n$ is a natural angular frequency.

Here, substituting $K_{pb}$ for the first term and $K_{db}$ for the coefficient of the second term in expression 8 yields expression 9.

$$C_b(s) = K_{pb} + K_{db} \cdot s \quad \text{[Expression 9]}$$

Expression 9 indicates that pressure control process $C_b(s)$ has only to be configured from a proportional gain that has undergone differential compensation. Hence, pressure control unit 420 uses proportional-differential (PD) control.

Figure 4:
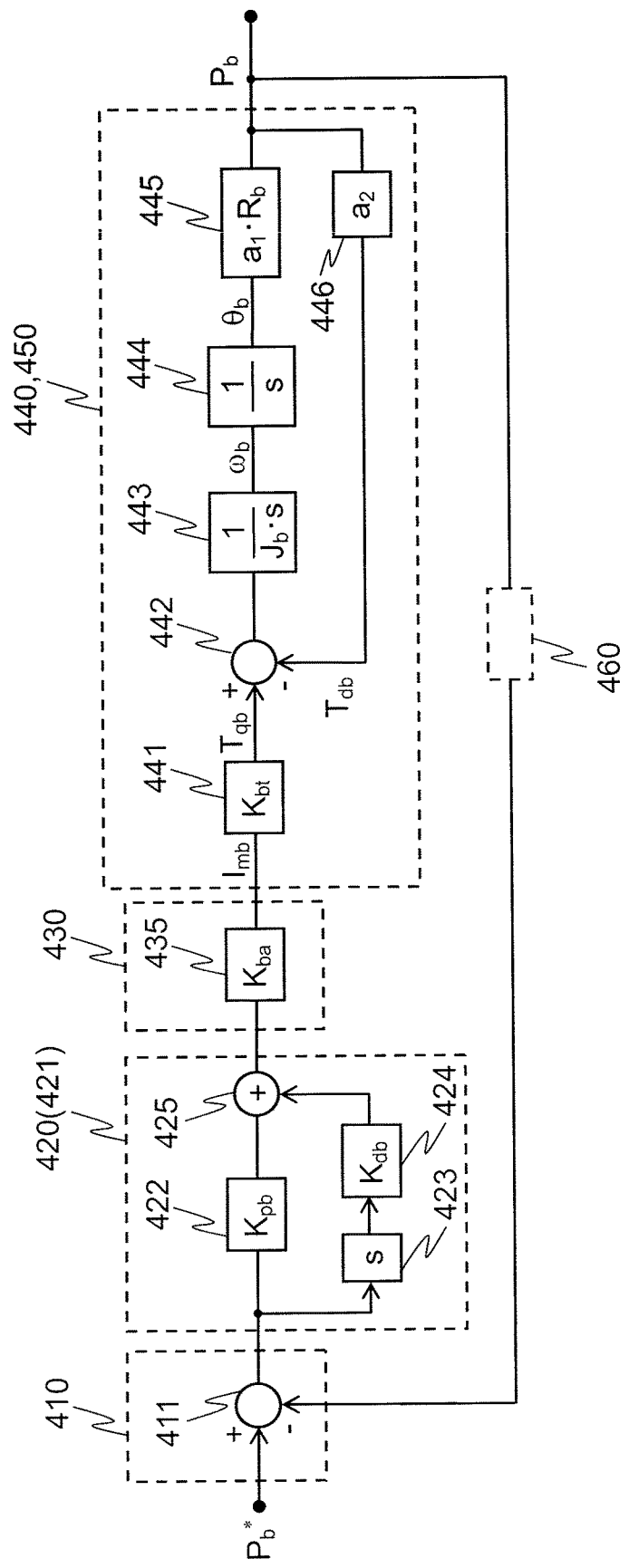
FIG. 4 shows a modeled control system for mechanical braking using PD control of the speed control device according to the first embodiment.

FIG. 4 shows a modeled control system for mechanical braking using PD control. FIG. 4 shows that PD control has been applied to pressure control unit 420 in FIG. 3. Here, only components of pressure control unit 420 (arithmetic unit 421) different from those of FIG. 3 are described.

Arithmetic unit 422 computes a pressure error calculated by adder 411 and a proportional gain ($K_{pb}$). Arithmetic unit 424 multiplies a pressure error differentiated by differentiator 423 by a differential gain ($K_{db}$). Adder 425 adds the computation result by arithmetic unit 422 and that by arithmetic unit 424, and outputs the sum to arithmetic unit 435.

As shown in FIG. 4, arithmetic unit 421, corresponding to pressure control unit 420 in FIG. 1, can adjust the response of actual pressure $P_b$ measured by pressure sensor 460, to instructed brake pressure $P_b^*$ by adjusting the two gains ($K_{pb}$ and $K_{db}$). In other words, pressure control unit 420 can adjust the response of actual pressure $P_b$ to instructed brake pressure $P_b^*$ using the two gains.

1-2-3. Coordination with Speed Control System

Figure 5:
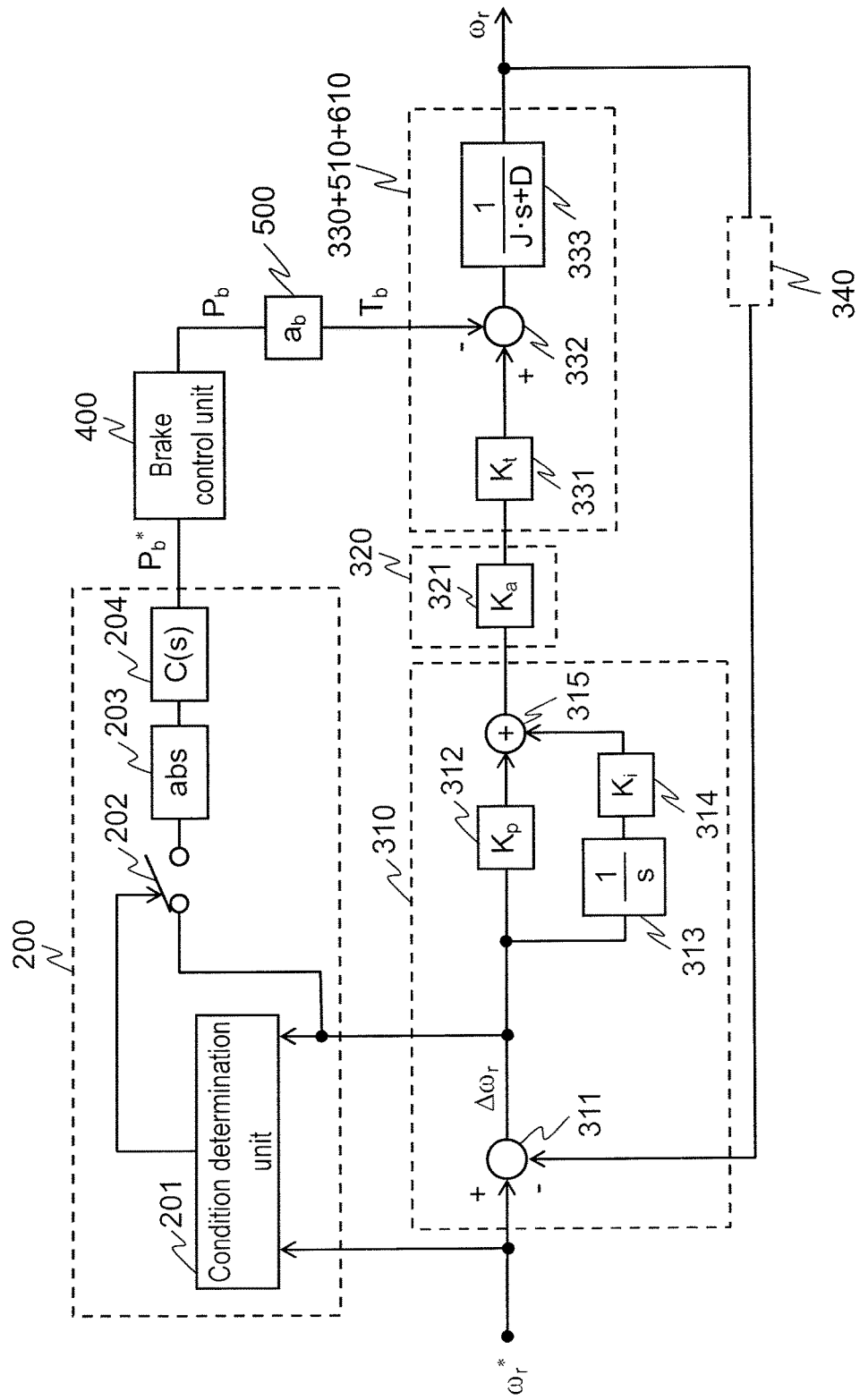
FIG. 5 shows a traveling speed control system and a control system for mechanical braking, both modeled, of the speed control device according to the first embodiment.

FIG. 5 shows a traveling speed control system and a control system for mechanical braking, both jointly modeled.

First, the traveling speed control system is described.

In control unit 310, adder 311 calculates speed error $\Delta\omega_r$ between instructed speed $\omega_r^*$ [km/h] and traveling speed $\omega_r$ [km/h] measured by speed sensor 340, namely $(\omega_r^*-\omega_r)$ [km/h]. Arithmetic unit 312 multiplies speed error $(\omega_r^*-\omega_r)$ by proportional gain $K_p$. Integrator 313 integrates speed error $(\omega_r^*-\omega_r)$. Arithmetic unit 314 multiplies the computation result by integrator 313 by integration gain $K_i$. Adder 315 adds the computation result by arithmetic unit 312 to that by arithmetic unit 314. Arithmetic unit 321, corresponding to motor drive unit 320, computes the computation result by adder 315 and driver gain $K_a$ of motor drive unit 320.

In electric motor 330, speed reducer 510, driving wheel 610, and an electromotive vehicle (unillustrated) in FIG. 1, arithmetic unit 331 computes the computation result by arithmetic unit 321 and torque constant $K_t$ of electric motor 330. Adder 332 computes the computation result by arithmetic unit 331 and brake torque $T_b$ expressed by expression 3. Arithmetic unit 333 computes the computation result by adder 332 and the result derived by Laplace-transforming inertia moment J and viscosity resistance D to yield traveling speed $\omega_r$.

In the control system for mechanical braking, meanwhile, condition determination unit 201 of determination unit 200 uses instructed speed $\omega_r^*$ from controller 100 and speed error $(\omega_r^*-\omega_r)$. calculated by speed control unit 300 to determine brake operation. Operation of condition determination unit 201 is described later. Switch 202 is turned on and off in response to results by condition determination unit 201. If switch 202 is on, arithmetic unit 203 calculates the absolute value of speed error $(\omega_r^*-\omega_r)$. Arithmetic unit 204 performs collaboration control process C(s) between the computation result by arithmetic unit 203 and speed error $(\omega_r^*-\omega_r)$. Brake control unit 400 performs the above-described computation for the computation result by determination unit 200 to yield brake pressure $P_b$. The actual braking torque value of hydraulic brake 500 to brake pressure $P_b$ becomes $T_b$.

Hereinafter, only a case of deceleration is described.

Figure 6:
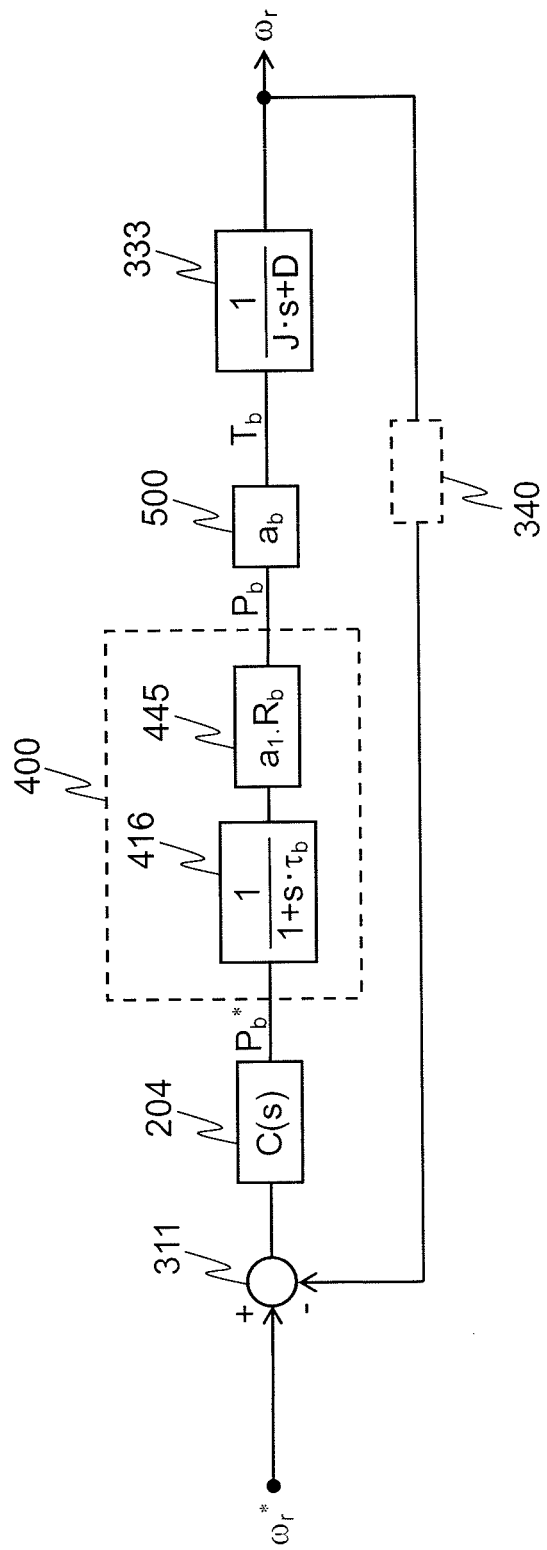
FIG. 6 is a simplified FIG. 5.

Brake control unit 400 is assumed to be controlled with an appropriate gain during deceleration. At this moment, if response from instructed brake pressure $P_b^*$ to brake pressure $P_b$ is approximated by a first-order lag, where the time constant is $\tau_b$, and is replaced with expression 10, FIG. 5 can be simplified as shown by FIG. 6. FIG. 6 is a simplified FIG. 5.

$$\frac{1}{1+s\cdot\tau_b} \qquad \text{[Expression 10]}$$

In FIG. 6, brake control unit 400 in FIG. 5 has been replaced with arithmetic unit 416 computing expression 10 and arithmetic unit 445 calculating brake pressure $P_b$ from the computation result by arithmetic unit 416.

Here, transfer function G(s) from instructed speed $\omega_r^*$ to actual speed $\omega_r$ is derived as expression 11.

$$G(s) = \frac{C(s)\cdot\dfrac{a_1\cdot R_b\cdot a_b}{1+s\cdot\tau_b}\cdot\dfrac{1}{J\cdot s+D}}{1+C(s)\cdot\dfrac{a_1\cdot R_b\cdot a_b}{1+s\cdot\tau_b}\cdot\dfrac{1}{J\cdot s+D}} \qquad \text{[Expression 11]}$$

Further, expression 11 is transformed to expression 12.

$$G(s) = \frac{C(s)\cdot\dfrac{a_1\cdot R_b\cdot a_b}{\tau_b\cdot J}}{s^2+\dfrac{J+\tau_b\cdot D}{\tau_b\cdot J}\cdot s+C(s)\cdot\dfrac{a_1\cdot R_b\cdot a_b}{\tau_b\cdot J}} \qquad \text{[Expression 12]}$$

To allow speed response to be adjusted, collaboration control process C(s) uses PD control from expression 12. In other words, C(s) has only to be configured from proportional gain $K_{pc}$ with differential compensation $K_{dc}$ added. Hence, substituting $C(s)=K_{pc}+K_{dc}\cdot s$ for expression 12 yields expression 13.

$$G(s) = \frac{K_{pc}\cdot\dfrac{a_1\cdot R_b\cdot a_b}{\tau_b\cdot J}+K_{dc}\cdot\dfrac{a_1\cdot R_b\cdot a_b}{\tau_b\cdot J}\cdot s}{s^2+\left(\dfrac{J+\tau_b\cdot D}{\tau_b\cdot J}+K_{dc}\cdot\dfrac{a_1\cdot R_b\cdot a_b}{\tau_b\cdot J}\right)\cdot s+K_{pc}\cdot\dfrac{a_1\cdot R_b\cdot a_b}{\tau_b\cdot J}} \qquad \text{[Expression 13]}$$

The characteristic equation of expression 13 is expressed by expression 14.

$$s^2+\left(\dfrac{J+\tau_b\cdot D}{\tau_b\cdot J}+K_{dc}\cdot\dfrac{a_1\cdot R_b\cdot a_b}{\tau_b\cdot J}\right)\cdot s+K_{pc}\cdot\dfrac{a_1\cdot R_b\cdot a_b}{\tau_b\cdot J} \equiv$$
$$s^2+2\cdot\zeta\cdot\omega_n\cdot s+\omega_n^2 \qquad \text{[Expression 14]}$$

From expression 14, expressions 15 and 16 are derived.

$$2\cdot\zeta\cdot\omega_n = \dfrac{J+\tau_b\cdot D}{\tau_b\cdot J}+K_{dc}\cdot\dfrac{a_1\cdot R_b\cdot a_b}{\tau_b\cdot J} \qquad \text{[Expression 15]}$$

$$\omega_n^2 = K_{pc}\cdot\dfrac{a_1\cdot R_b\cdot a_b}{\tau_b\cdot J} \qquad \text{[Expression 16]}$$

Expression 15 indicates that attenuation coefficient $\zeta$ can be adjusted by differential gain $K_{dc}$. Expression 16 indicates that specific frequency $\omega_n$ can be adjusted by proportional gain $K_{pc}$.

From all of the above, brake control unit 400 can adjust response of actual speed to instructed speed during deceleration by adjusting the two gains: $K_{pc}$ and $K_{dc}$.

1-2-4. Determination of Brake Operation

Figure 7:
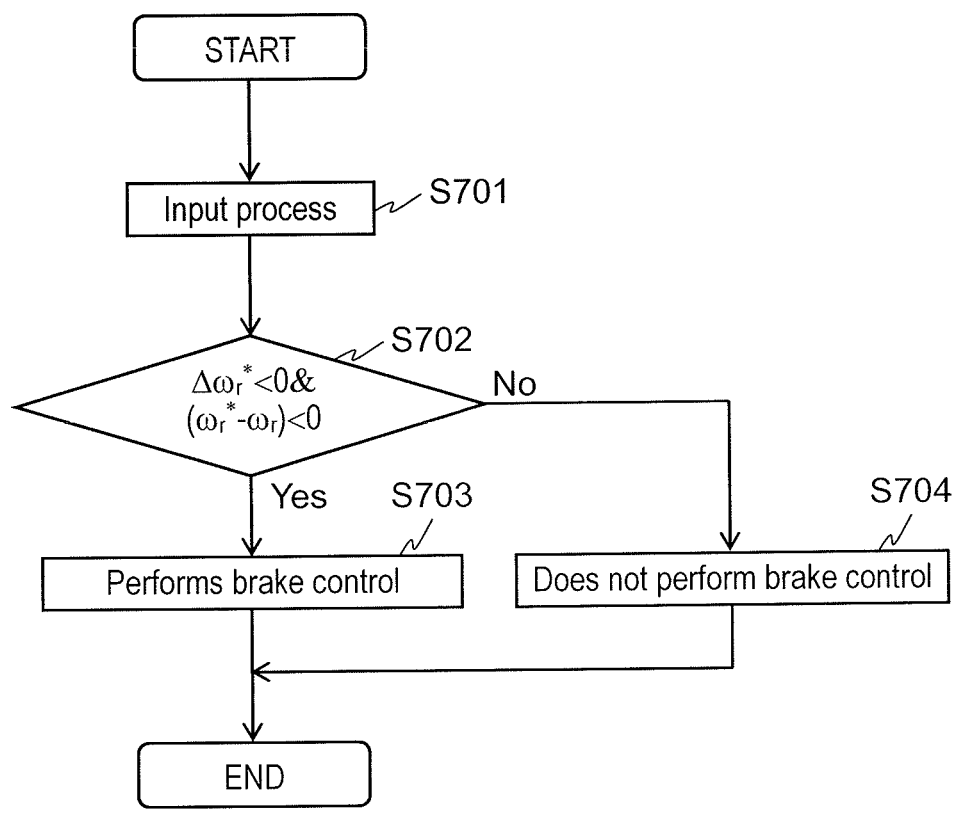
FIG. 7 is a flowchart showing operation of brake control by the speed control device according to the first embodiment.

FIG. 7 is a flowchart illustrating operation of brake control in the first embodiment.

Step S701: Condition determination unit 201 of determination unit 200 performs an input process. Condition determination unit 201 receives instructed speed $\omega_r^*$ from controller 100. Condition determination unit 201 receives traveling speed $\omega_r$ and speed error $(\omega_r^*-\omega_r)$ from speed control unit 300. Here, condition determination unit 201 may receive only traveling speed $\omega_r$ from speed control unit 300 to compute speed error $(\omega_r^*-\omega_r)$. Further, condition determination unit 201 saves previous instructed speed $\omega_r^*$ in memory and calculates difference $\Delta\omega_r^*$ of instructed speed $\omega_r^*$. Here, $\Delta\omega_r^*>0$ indicates that the current instructed speed is an instruction to accelerate. Similarly, $\Delta\omega_r^*=0$ indicates an instruction to maintain the speed; $\Delta\omega_r^*<0$ indicates an instruction to decelerate.

Step S702: Condition determination unit 201 determines whether the next two conditions for deceleration are satisfied. As the first condition, condition determination unit 201 determines whether instructed speed $\omega_r^*$ is an instruction to decelerate, namely $\Delta\omega_r<0$ is satisfied or not. As the second condition, condition determination unit 201 determines whether traveling speed $\omega_r$ is higher than instructed speed $\omega_r^*$, namely $(\omega_r^*-\omega_r)<0$ is satisfied or not. If condition determination unit 201 has determined that the two conditions are satisfied, the process proceeds to step S703; otherwise, to step S704. The two conditions are for determining whether only the braking force of the regenerative brake due to electric motor 330 can sufficiently control the speed.

Step S703: Condition determination unit 201 determines that mechanical braking needs to be applied because only the regenerative brake due to electric motor 330 provides an insufficient braking force. Condition determination unit 201 controls brake control unit 400 to compensate a deficit of a braking force due to the regenerative brake with mechanical braking. Brake control unit 400 controls brake operation in response to speed error $(\omega_r^*-\omega_r)$.

Step S704: Condition determination unit 201 determines that mechanical braking does not need to be applied because the regenerative brake due to electric motor 330 provides a sufficient braking force, and controls brake control unit 400 not to perform brake operation. In this case, determination unit 200 zeros instructed brake pressure $P_b^*$ to be input to brake control unit 400.

1-2-5. Operation Example

Figure 8:
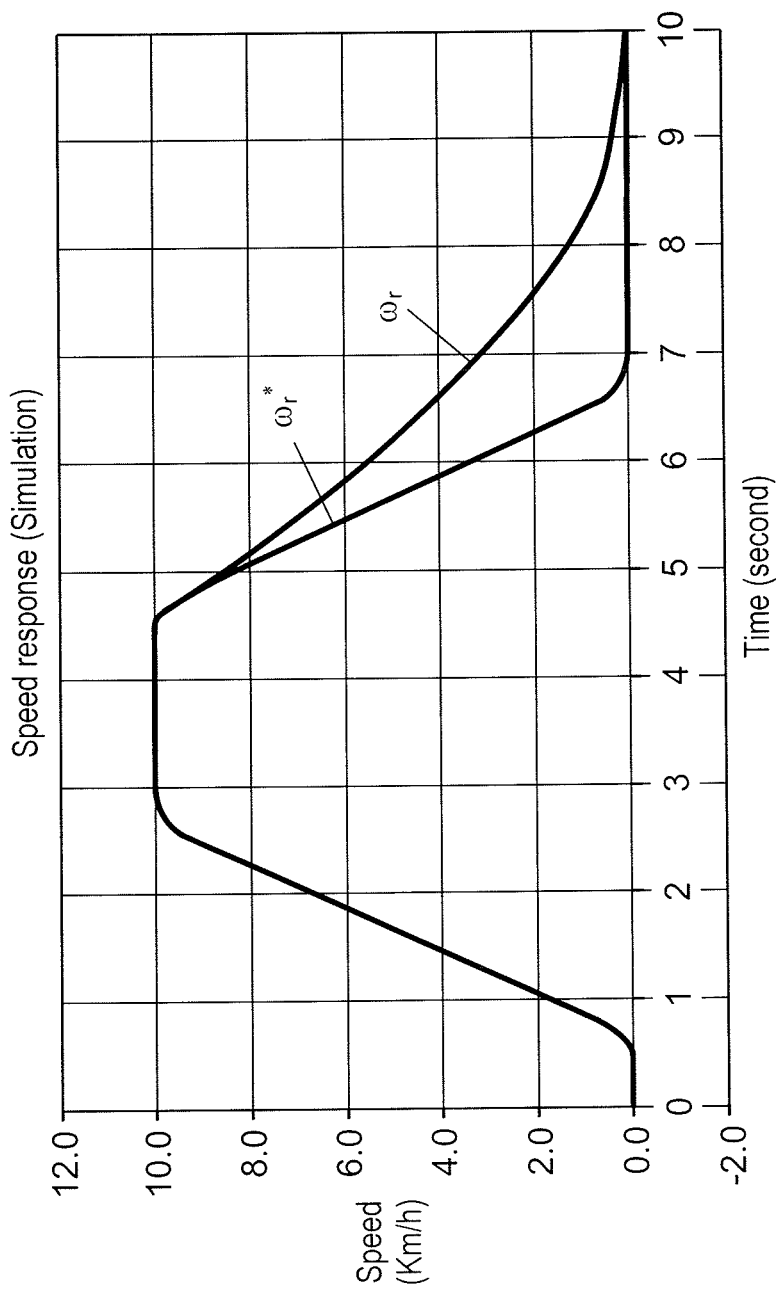
FIG. 8 illustrates an example of speed response under existing speed control.

FIG. 8 illustrates an example of speed response in existing speed control. FIG. 8 shows temporal change of instructed speed $\omega_r^*$ and temporal change of traveling speed $\omega_r$. In FIG. 8, the vertical axis represents speed [km/h]; the horizontal axis represents elapsed time [second] from the start.

As shown in FIG. 8, instructed speed $\omega_r^*$ begins with 0 [km/h], gradually becomes an instruction to accelerate after 0.5 second, and reaches 10 [km/h] after 3 seconds. Subsequently, instructed speed $\omega_r^*$ maintains 10 [km/h] till 4.5-second point, gradually becomes an instruction to decelerate, and reaches 0 [km/h] (an instruction to stop) after 7-second point.

An electromotive vehicle under previous speed control, meanwhile, begins with a stopped state $(\omega_r=0)$, accelerates following instructed speed $\omega_r^*$ from 0.5-second point, and reaches 10 [km/h] after 3 seconds. Subsequently, the vehicle maintains constant speed $(\omega_r=10)$, and begins to decelerate from 4.5-second point; however, is immediately unable to follow instructed speed $\omega_r^*$. Speed error $(\omega_r^*-\omega_r)$ gradually increases and the vehicle stops after 10 seconds $(\omega_r=0)$.

Figure 9:
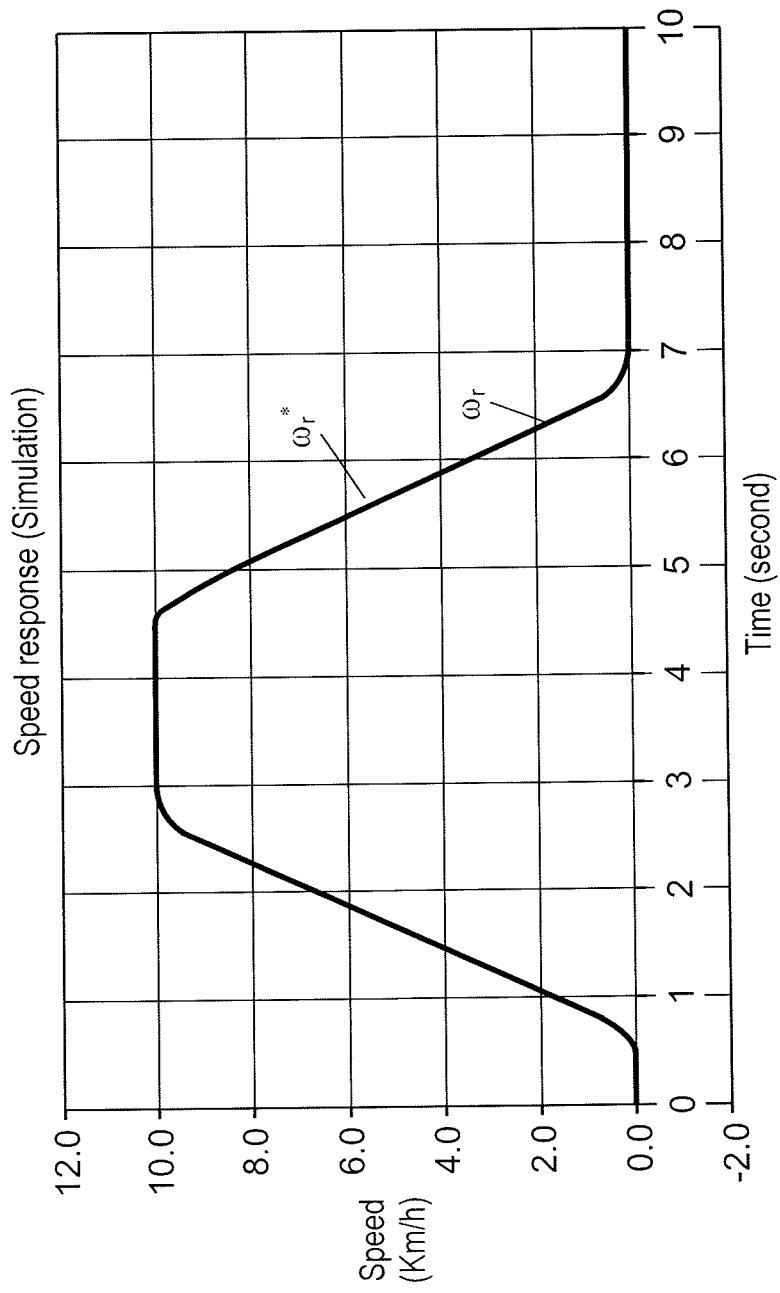
FIG. 9 illustrates an example of speed response under speed control by the speed control device according to the first embodiment.

FIG. 9 illustrates an example of speed response under speed control by speed control device 1 according to the first embodiment. FIG. 9 shows temporal change of instructed speed $\omega_r^*$ and temporal change of traveling speed $\omega_r$. In FIG. 9, the vertical axis represents speed [km/h]; the horizontal axis represents elapsed time [second] from the start.

In the case of FIG. 9, speed control same as that of FIG. 8 is performed. FIG. 9 indicates that traveling speed $\omega_r$ is following instructed speed $\omega_r^*$. In this case, instructed speed $\omega_r^*$ is not an instruction to decelerate till 4.5-second point from a stopped state and traveling speed $\omega_r$ is following instructed speed $\omega_r^*$, and thus instructed speed $\omega_r^*$ is equal to traveling speed $\omega_r$ or higher. Hence, determination unit 200 determines that mechanical braking does not need to be applied and controls brake control unit 400 not to perform brake operation. Determination unit 200 determines that instructed speed $\omega_r^*$ has become an instruction to decelerate after 4.5-second point and traveling speed $\omega_r$ has exceeded instructed speed $\omega_r^*$. Determination unit 200 determines that mechanical braking needs to be applied because the two conditions are satisfied and controls the brake control unit 400 to perform brake operation. Brake control unit 400 performs control to apply mechanical braking from the above-described computation in response to speed error $(\omega_r^*-\omega_r)$. Under this control, traveling speed $\omega_r$ of the electromotive vehicle follows instructed speed $\omega_r^*$ to decelerate and to stop.

1-3. Summary

As described above, speed control unit 1 of an electromotive vehicle according to the first embodiment includes electric motor 330, speed control unit 300, brake control unit 400, speed sensor 340, and determination unit 200. Electric motor 330 drives driving wheels 610. Speed control unit 300 controls driving of electric motor 330 according to instructed speed $\omega_r^*$. Brake control unit 400 applies mechanical braking to the electromotive vehicle. Speed sensor 340 detects traveling speed $\omega_r$ of the electromotive vehicle. Determination unit 200 determines that mechanical braking needs to be applied if instructed speed $\omega_r^*$ indicates deceleration and traveling speed $\omega_r$ is higher than instructed speed $\omega_r^*$, and controls brake control unit 400 to work hydraulic brake 500.

With this situation, determination unit 200, if determining that the above-described conditions are satisfied, instructs brake control unit 400 to output instructed brake pressure $P_b^*$ corresponding to speed error $(\omega_r^*-\omega_r)$. The electromotive vehicle can automatically compensate a deficit of a braking force of the regenerative brake caused by electric motor 330 with mechanical braking. The mechanical braking is applied so that speed error $(\omega_r^*-\omega_r)$ becomes zero.

The first embodiment thus can run the electromotive vehicle following instructed speed. For example, if the braking force of the regenerative brake is insufficient and traveling speed $\omega_r$ is not following instructed speed $\omega_r^*$ during deceleration, the electromotive vehicle can be made to follow instructed speed $\omega_r^*$. Further, the electromotive vehicle can be made to suddenly stop with instructed speed $\omega_r^*=0$.

Second Exemplary Embodiment 2-1. Decrease of Mechanical Braking Force

In an electromotive vehicle, the mechanical braking force decreases due to wear of brake shoe 504 for example and a deficit of the regenerative brake cannot be compensated in some cases. In such a case, the electromotive vehicle may fail to follow the instructed speed immediately before a stop.

Concretely, if the electromotive vehicle stops with instructed speed $\omega_r^*=0$ in the first embodiment, speed error $(\omega_r^*-\omega_r)=0$. In this case, the determination of step S702 in FIG. 7 is "No", where brake control is not performed. For an insufficient mechanical braking force, however, the electromotive vehicle keeps moving (traveling speed $\omega_r^*>0$) in spite of $\omega_r^*=0$, and thus the vehicle can be in an incomplete stop at the time.

In the second embodiment, operation of condition determination unit 201 of determination unit 200 to avoid the circumstances is described. Only the operation of condition determination unit 201 is described because the second embodiment is different from the first only in the operation.

2-2. Operation 2-2-1. Determination of Brake Operation

Figure 10:
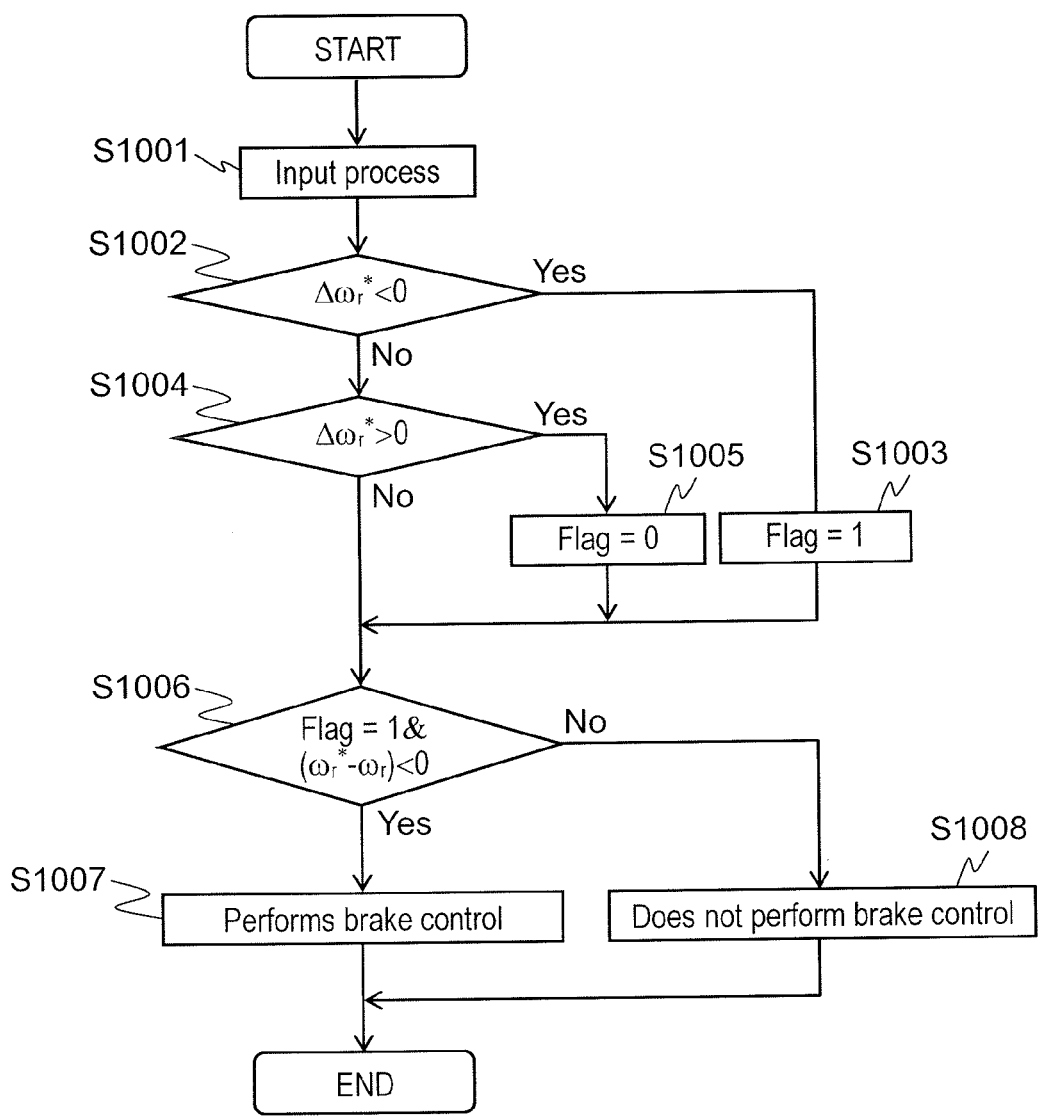
FIG. 10 is a flowchart showing operation of brake control by the speed control device according to the second exemplary embodiment.

FIG. 10 is a flowchart illustrating operation of the brake control in the second embodiment. In the second embodiment, a flag indicating whether an instruction to decelerate has been issued.

Step S1001: Condition determination unit 201 performs an input process. Determination unit 200 receives instructed speed $\omega_r^*$ from controller 100. Condition determination unit 201 saves previous instructed speed $\omega_r^*$ in memory and calculates difference $\Delta\omega_r^*$ of instructed speed $\omega_r^*$.

Step S1002: Condition determination unit 201 determines whether $\Delta\omega_r^*<0$ (an instruction to decelerate). If the condition is satisfied, the process flow precedes to step S1003; otherwise, to step S1004.

Step S1003: Condition determination unit 201 sets the flag=1 (an instruction to decelerate).

Step S1004: Condition determination unit 201 determines whether $\Delta\omega_r^*>0$ (an instruction to accelerate). If the condition is satisfied, the process flow precedes to step S1005; otherwise, to step S1006.

Step S1005: Condition determination unit 201 sets the flag=0 (an instruction to accelerate).

Step S1006; Condition determination unit 201 determines whether flag=1 and at the same time $(\omega_r^*-\omega_r)<0$. If the condition is satisfied, the process flow precedes to step S1007; otherwise, to step S1008. Conditions of proceeding to step S1007 are supposedly the following two cases. One is the case where traveling speed $\omega_r$ of the electromotive vehicle is not following instructed speed $\omega_r^*$ $(\omega_r^*-\omega_r^*<0)$ with an instruction to decelerate having been issued (flag=1). The other is the case where traveling speed $\omega_r$ of the vehicle is not following instructed speed $\omega_r^*$ $(\omega_r^*-\omega_r^*<0)$ where the instruction immediately before is to decelerate (flag=1) and the instructed speed continues to be constant (including $\Delta\omega_r^*=0$ and $\omega_r^*=0$).

Step S1007: Condition determination unit 201 determines that brake control needs to be performed because traveling speed $\omega_r$ is not following instructed speed $\omega_r^*$. Condition determination unit 201 turns on switch 202 and instructs arithmetic unit 203 to output the computation result $(\omega_r^*-\omega_r)$ by adder 311. Arithmetic units 203 and 204 of determination unit 200 calculate brake pressure $P_b$. Brake control unit 400 performs brake operation in response to brake pressure $P_b$ and applies mechanical braking to driving wheel 610.

Step S1008: Condition determination unit 201 determines that brake control does not need to be performed because the traveling speed is following the instructed speed and turns off switch 202. In this case, arithmetic units 203 and 204 of determination unit 200 do not compute. Determination unit 200 sets instructed brake pressure $P_b^*=0$ and inputs it to brake control unit 400. Brake control unit 400 does not perform brake operation because $P_b^*=0$.

2-2-2. Concrete Example

Figure 11:
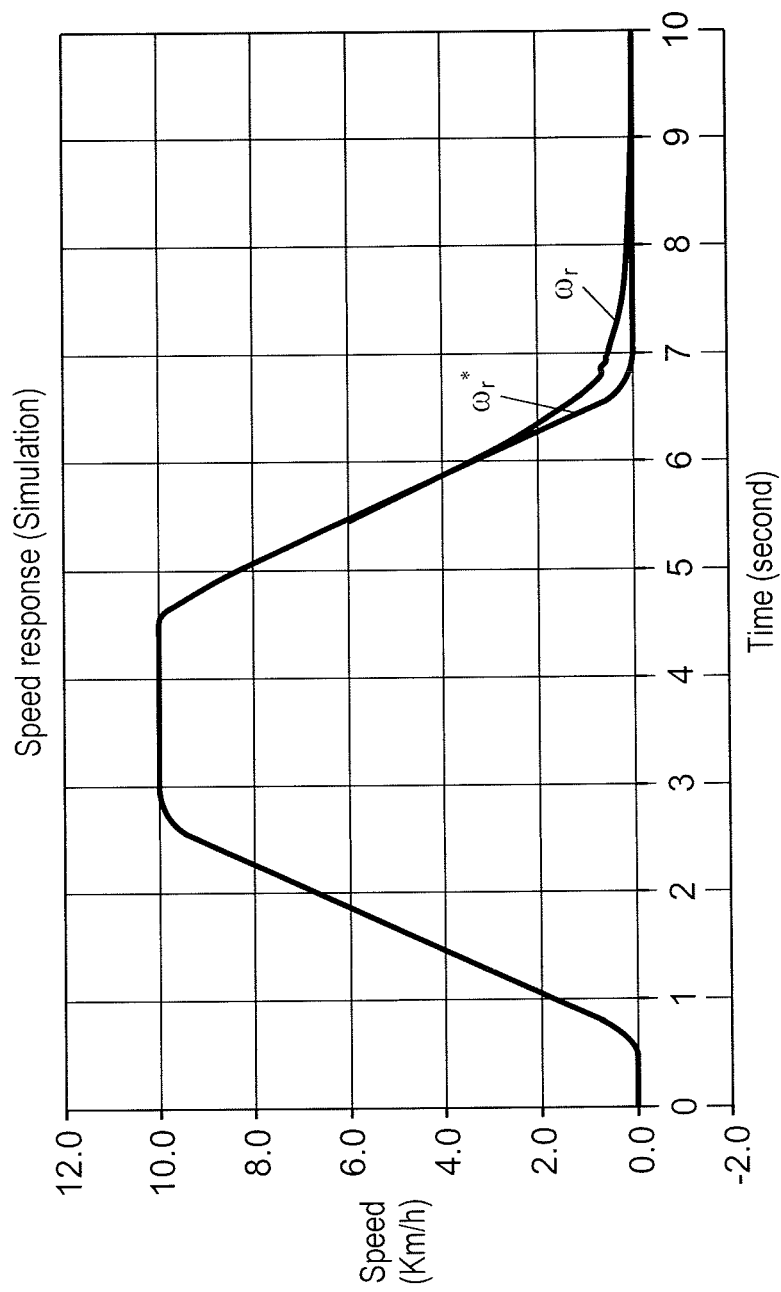
FIG. 11 illustrates an example of speed response with an insufficient mechanical braking force in the first embodiment.
Figure 12:
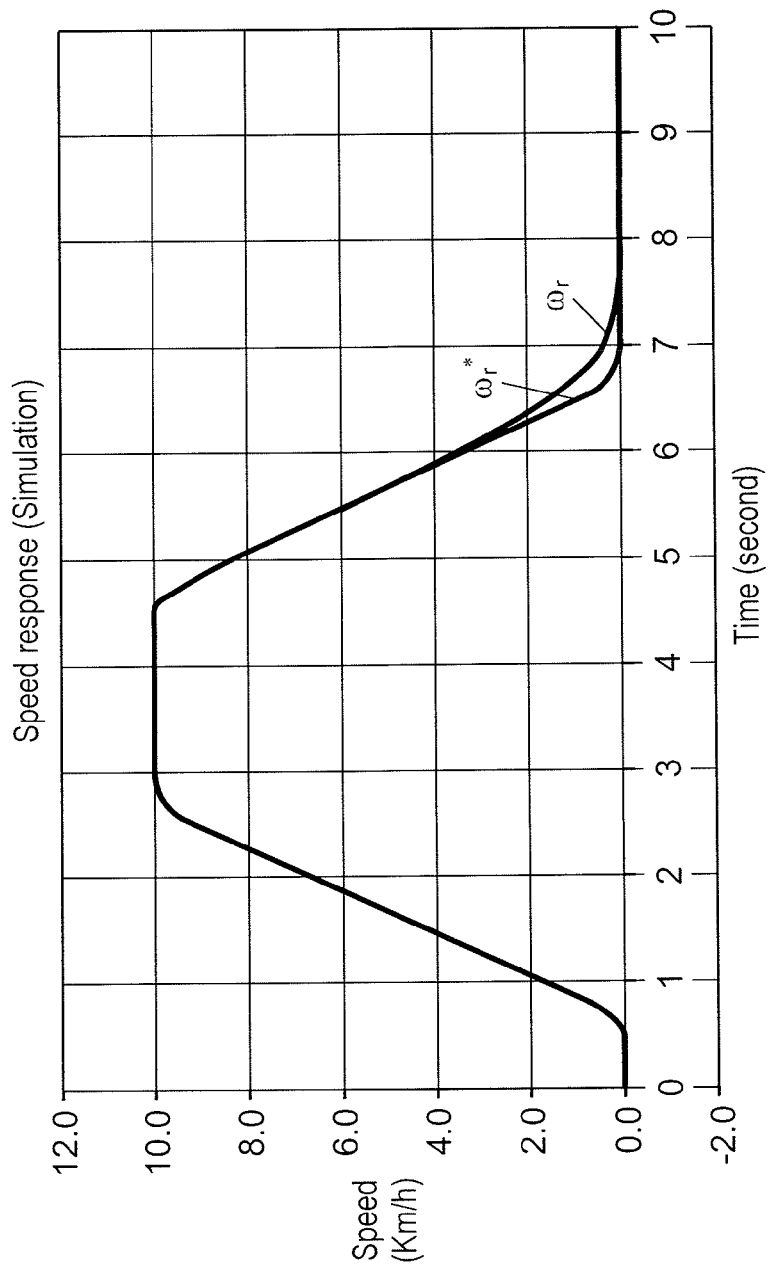
FIG. 12 illustrates an example of speed response under speed control by the speed control device according to the second embodiment.

FIG. 11 illustrates an example of speed response with an insufficient mechanical braking force in the first embodiment. FIG. 12 illustrates an example of speed response under speed control in the second embodiment. In FIGS. 11 and 12, speed control is performed in the same way as in FIG. 8. FIGS. 11 and 12 show temporal change of instructed speed $\omega_r^*$ and temporal change of traveling speed $\omega_r$. In FIGS. 11 and 12, the vertical axis represents speed [km/h]; the horizontal axis represents elapsed time [second] from the start.

In FIG. 11, traveling speed $\omega_r$ cannot follow instructed speed $\omega_r^*$ from around 6-second point after the start. From 7-second point, instructed speed $\omega_r^*=0$ and $\Delta\omega_r^*0$, and thus the brake control stops. However, $\omega_r$ is not zero, and thus the electromotive vehicle proves to continue traveling due to inertia to stop at around 8.5-second point.

In FIG. 12, meanwhile, instructed speed $\omega_r^*=0$ at 7-second point from the start, and $\Delta\omega_r^*=0$ since then. In steps S1002 and S1004 of FIG. 10, the determination results in "No" in either steps, which does not change the state of the flag. That is, the flag retains its state from the previous determination. In this case, the electromotive vehicle was in a deceleration state immediately before ("Yes" in step S1002), and thus the flag retains flag=1. From the determination of step S1006 in FIG. 10, the process flow proceeds to step S1007 to perform brake control. Consequently, brake control functions even after instructed speed $\omega_r^*=0$, and the electromotive vehicle stops at around 7.5-second point as shown in FIG. 12. When the electromotive vehicle stops, speed error $(\omega_r^*-\omega_r)$ becomes zero to release (in the case of "No") the condition of step S1006 in FIG. 10, stopping brake control.

2-3. Summary

In speed control unit 1 of an electromotive vehicle according to the second embodiment, determination unit 200 determines that mechanical braking needs to be applied in the next two cases. One is the case where the instructed speed indicates deceleration (flag=1) and the traveling speed is higher than the instructed speed $(\omega_r^*-\omega_r<0)$. The other is the case where the instructed speed indicates that the vehicle continues to travel at a constant speed after deceleration (flag=1 and at the same time $\Delta\omega_r^*=0$) and the traveling speed is higher than the instructed speed $(\omega_r^*-\omega_r<0)$. According to this determination, determination unit 200 controls brake control unit 400 to work hydraulic brake 500.

Resultingly, when the electromotive vehicle is traveling in spite of the fact that the instructed speed is zero after deceleration, mechanical braking can be applied until the vehicle completely stops.

Accordingly, even if the mechanical control force is insufficient due to wear of brake shoe 504 for example and traveling speed $\omega_r$ cannot follow instructed speed $\omega_r^*$, mechanical braking can be retained until traveling speed $\omega_r$ starts following instructed speed $\omega_r^*$.

Third Exemplary Embodiment

In the third exemplary embodiment, a locking mechanism is added to the speed control unit in the first and second embodiments to improve the accuracy in the stop operation of an electromotive vehicle.

3-1. Configuration

Figure 13:
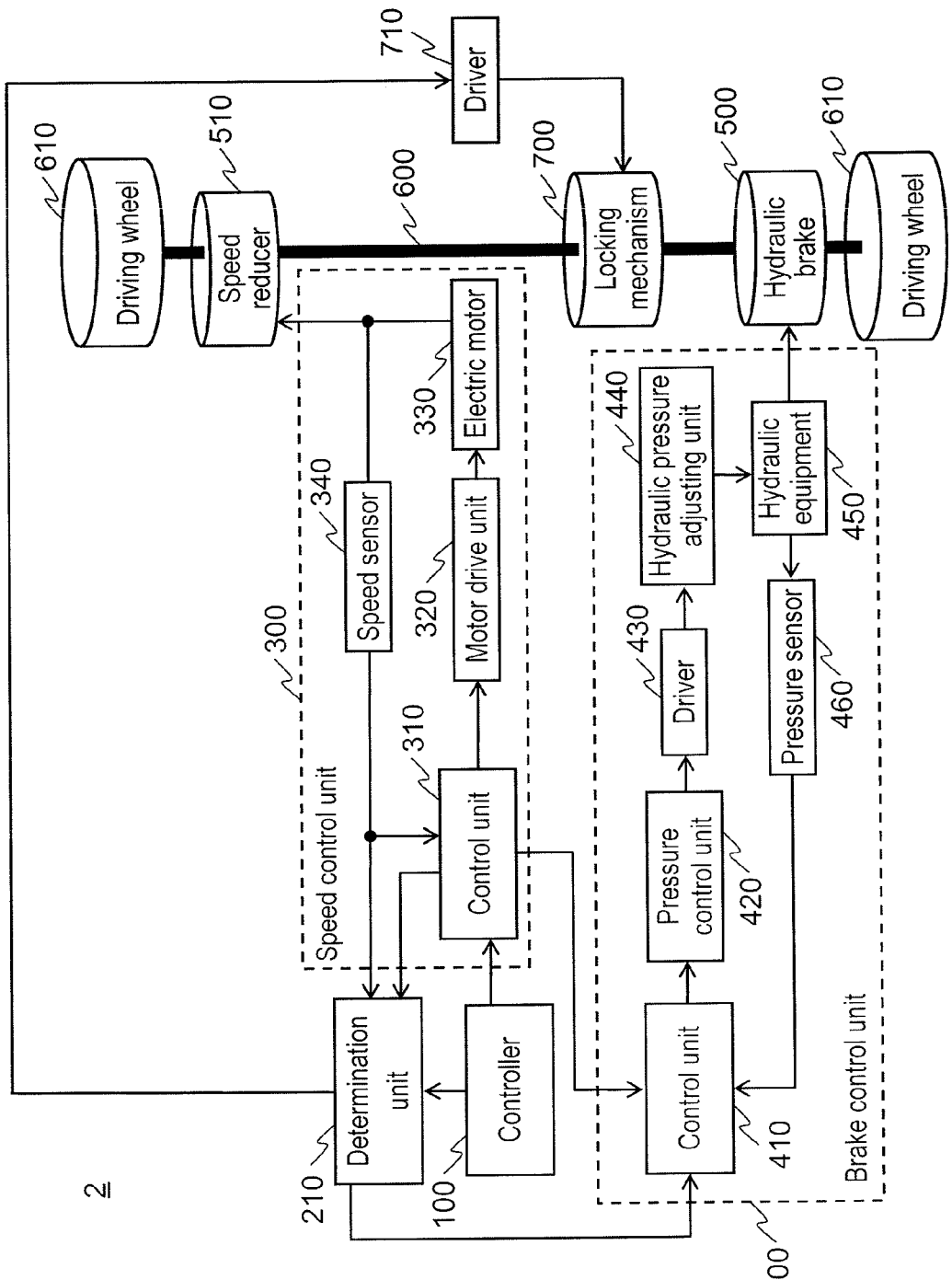
FIG. 13 is a block diagram illustrating a configuration example of a speed control device of an electromotive vehicle according to the third exemplary embodiment.

FIG. 13 is a block diagram illustrating a configuration example of speed control device 2 of an electromotive vehicle according to the third embodiment. In FIG. 13, a component that performs the same operation as that of speed control unit 1 in FIG. 1 is given the same reference mark and its description is omitted. Here, operation of determination unit 210 and locking mechanism 700 is described.

As shown in FIG. 13, speed control unit 2 of the third embodiment is speed control unit 1 of FIG. 1 additionally including locking mechanism 700 and driver 710 controlling locking mechanism 700.

Locking mechanism 700 is provided on driving shaft 600 to mechanically lock operation of driving wheel 610. Driver 710 controls driving and stopping of locking mechanism 700 in response to control of determination unit 210.

3-2. Operation

Figure 14:
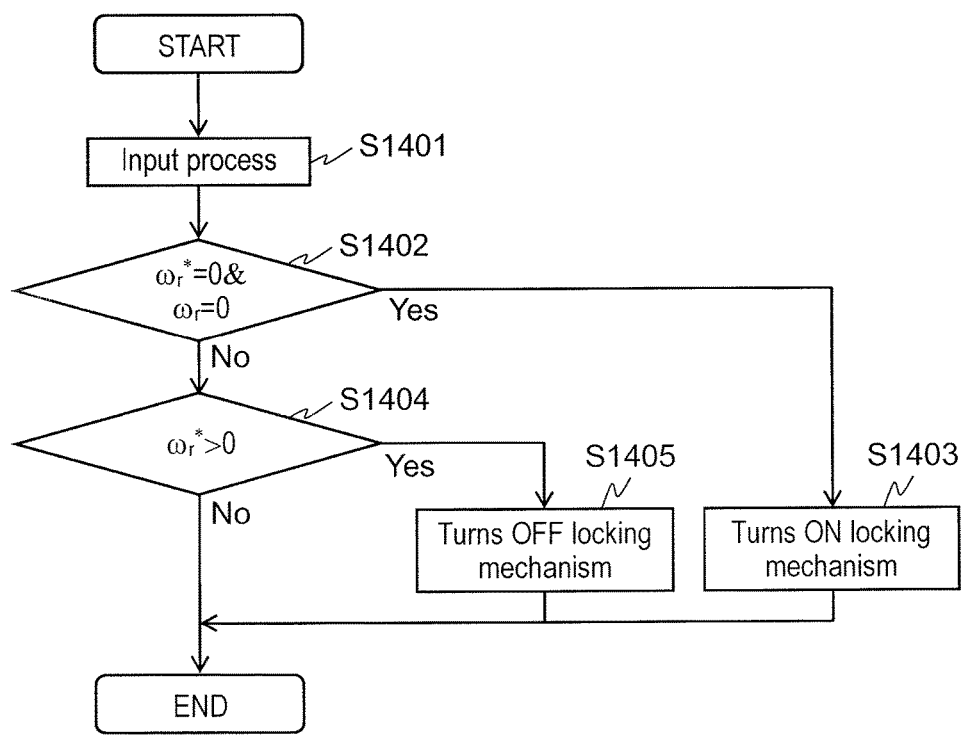
FIG. 14 is a flowchart illustrating control of the locking mechanism mechanism of the speed control device according to the third embodiment.

FIG. 14 is a flowchart illustrating control of a locking mechanism in the third exemplary embodiment.

Step S1401: Condition determination unit 201 of determination unit 210 performs an input process. Determination unit 210 receives instructed speed $\omega_r^*$ from controller 100. Condition determination unit 201 receives traveling speed c), from speed control unit 300.

Step S1402: Condition determination unit 201 determines whether the electromotive vehicle is at a stop in a state of $\omega_r^*=0$ and at the same time $\omega_r=0$ (i.e., in a state where an instruction to stop has been issued). If the condition is satisfied, the process flow proceeds to step S1403; otherwise, to step S1404.

Step S1403: Condition determination unit 201 determines that the vehicle is at a stop in a state where an instruction to stop has been issued, and controls driver 710 to turn on locking mechanism 700.

Step S1404: Condition determination unit 201 determines whether $\omega_r^*>0$ (an instruction to travel). If the condition is satisfied, the process flow proceeds to step S1405. Otherwise, condition determination unit 201 determines that the current operation be maintained, does not control driver 710, and completes the process.

Step S1405: Condition determination unit 201 determines that an instruction to travel has been issued and makes driver 710 perform control to turn off locking mechanism 700.

3-3. Operation Example

Figure 15:
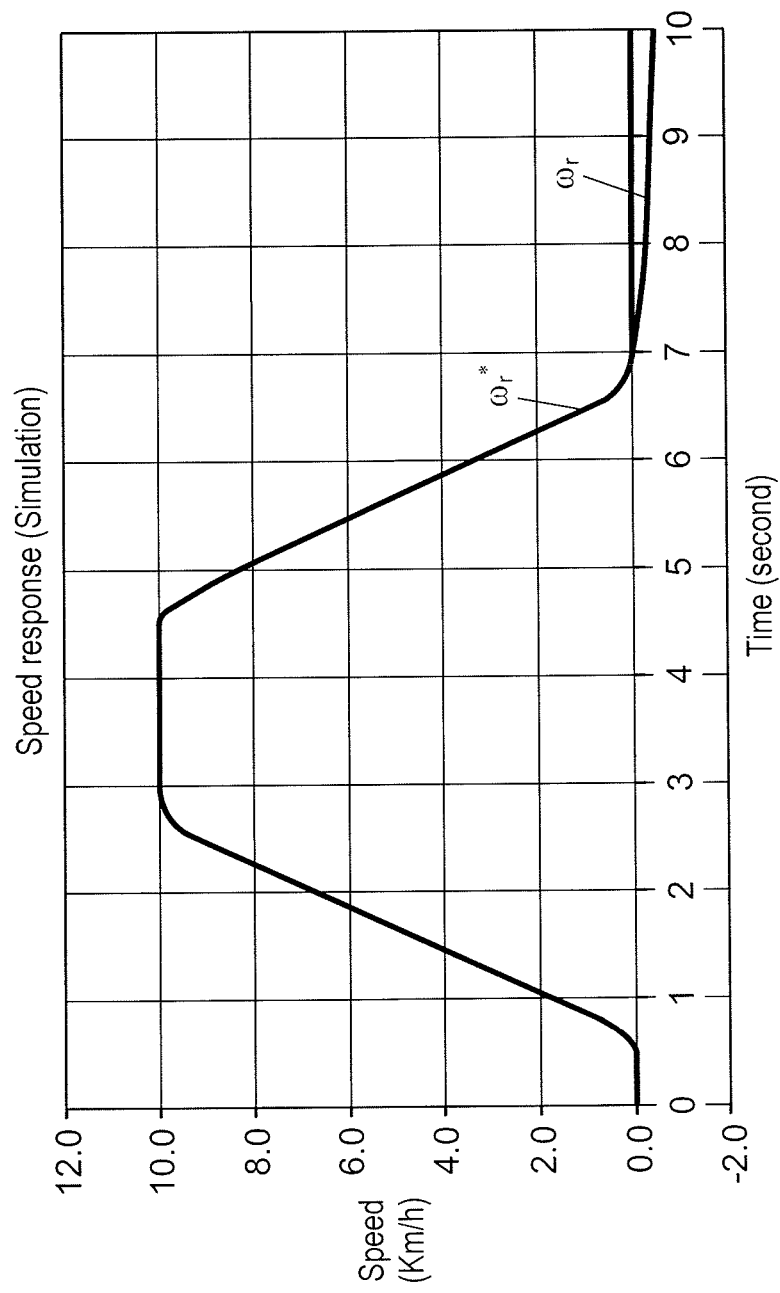
FIG. 15 illustrates an example of speed response under speed control by the speed control device without a locking mechanism provided.

FIG. 15 illustrates an example of speed response without a locking mechanism provided. FIG. 15 shows temporal change of instructed speed $\omega_r^*$ and temporal change of traveling speed $\omega_r$. In FIG. 15, the vertical axis represents speed [km/h]; the horizontal axis represents elapsed time [second] from the start. In FIG. 15, speed control is performed in the same way as in FIG. 8.

In FIG. 15, instructed speed $\omega_r^*$ and traveling speed co,. are zero at around 7-second point after the start. At this moment, the vehicle is at a stop according to instructed speed $\omega_r^*=0$. Brake control is also at a stop. Here, if the vehicle is positioned on an upslope for example, the vehicle can roll backward. FIG. 15 shows a situation where the vehicle is gradually increasing its speed in the negative direction from 7-second point. That is, the vehicle is rolling backward from the stopping position.

In the third embodiment, immediately after the vehicle stops at 7-second point in FIG. 15, determination is made as "Yes" in step S1402 in FIG. 14 and the process of step S1403 is executed. This turns on locking mechanism 700, allowing the vehicle to completely stop. Resultingly, the speed response shown in FIG. 9 can be achieved even if the vehicle stops on an upslope.

3-4. Summary

For speed control unit 2 of an electromotive vehicle according to the third embodiment, the vehicle includes locking mechanism 700 that mechanically locks the rotation of the driving wheels to maintain a stopped state. Determination unit 210 controls operation of locking mechanism 700 based on instructed speed $\omega_r^*$ and traveling speed $\omega_r$. When instructed speed $\omega_r^*$ indicates a stop ($\omega_r^*=0$) and at the same time traveling speed $\omega_r$ indicates a stop ($\omega_r=0$), determination unit 210 controls locking mechanism 700 to perform a locking operation.

Herewith, locking mechanism 700 automatically works when the vehicle stops in response to an instruction to stop.

Accordingly, the vehicle can maintain a stopped state. If the vehicle stops on an upslope for example, the vehicle can avoid rolling backward.

Other Exemplary Embodiments

Hereinbefore, the description is made of some embodiments for exemplification of the technologies in the disclosure. For this purpose, detailed descriptions and accompanying drawings are provided.

Accordingly, some components described in the detailed descriptions and accompanying drawings may include, besides what is essential for solving problems, what is not essential in order to exemplify the above-described technologies. Hence, the fact that such inessential components are included in the detailed descriptions and accompanying drawings does not mean that such inessential components are immediately acknowledged as essential.

The above-described embodiments are for exemplification of the technologies in the disclosure. Hence, the embodiments may undergo various kinds of change, substitution, addition, and/or omission within the scope of the claims and their equivalent technology.

INDUSTRIAL APPLICABILITY

A brake control unit of the present disclosure is applicable to an electromotive vehicle automatically operated or remotely controlled.

REFERENCE MARKS IN THE DRAWINGS 1, 2 speed control unit
100 controller
200, 210 determination unit
202 switch
203, 204, 312, 314, 321, 331, 333, 413, 416, 421, 422, 424, 435, 441, 443, 444, 445, 446 arithmetic unit
300 speed control unit
310, 410 control unit
311, 315, 332, 411, 425, 442 adder
313 integrator
320 motor drive unit
330 electric motor
340 speed sensor
400 brake control unit
420 pressure control unit
423 differentiator
430, 710 driver
440 hydraulic pressure adjusting unit
450 hydraulic equipment
451 master cylinder
452 push rod
453 lever
454 rotation shaft
460 pressure sensor
500 hydraulic brake
501 brake pipe
502 wheel cylinder
503 brake drum
504 brake shoe
510 speed reducer 600 driving shaft
610 driving wheel
611 wheel
700 locking mechanism

The invention claimed is:

1. A speed control device for an electromotive vehicle, the electromotive vehicle including an electric motor that drives a driving wheel, a hydraulic brake that applies mechanical braking to the electromotive vehicle, and a regenerative brake that applies regenerative braking to the electromotive vehicle due to the electric motor, the speed control device comprising:
a speed sensor that detects a traveling speed of the electromotive vehicle; and
at least one controller that:
receives an instructed speed based upon which the electric motor drives the driving wheel;
calculates a speed difference between the traveling speed detected by the speed sensor and the instructed speed;
determines whether only a braking force of the regenerative braking, due to the electric motor, is sufficient to make the speed difference zero; and
controls at least one of the mechanical braking, due to the hydraulic brake, and the regenerative braking, due to the electric motor, based on a result of the determining,
wherein both the regenerative braking and the mechanical braking are applied so that the mechanical braking compensates for a deficit of the regenerative braking, when the braking force of the regenerative braking is not sufficient to make the speed difference zero.

2. The speed control device of claim 1, wherein, when the instructed speed indicates deceleration and the traveling speed is higher than the instructed speed, both the mechanical braking and the regenerative braking are applied.

3. The speed control device of claim 1, wherein, when the instructed speed indicates travelling at a constant speed after deceleration and the traveling speed is higher than the instructed speed, both the mechanical braking and the regenerative braking are applied.

4. The speed control device of claim 1, wherein
the electromotive vehicle further includes a lock that mechanically locks rotation of the driving wheel and keeps the driving wheel in a stopped state,
the at least one controller controls operation of the lock based on the instructed speed and the traveling speed, and
the at least one controller performs control of the lock so that rotation of the driving wheel is locked and the driving wheel is kept in the stopped state when the instructed speed indicates a stop and the traveling speed simultaneously indicates the stop.

5. A speed control device for an electromotive vehicle, the speed control device comprising:
a memory that stores instructions; and
a processor that, when executing the instructions stored in the memory, performs operations including:
detecting a traveling speed of the electromotive vehicle from a speed sensor;
receiving an instructed speed based upon which an electric motor drives a driving wheel;
calculating a speed difference between the traveling speed detected from the speed sensor and the instructed speed;
determining whether only a braking force of regenerative braking, due to the electric motor, is sufficient to make the speed difference zero; and
controlling at least one of mechanical braking, due to a hydraulic brake, and the regenerative braking, due to the electric motor, based on a result of the determining,
wherein both the regenerative braking and the mechanical braking are applied so that the mechanical braking compensates for a deficit of the regenerative braking, when the braking force of the regenerative braking is not sufficient to make the speed difference zero.

6. The speed control device of claim 1, wherein the processor determines that the mechanical braking is to be applied when the instructed speed indicates deceleration and the traveling speed is higher than the instructed speed, and performs control so that the mechanical braking is applied, due to the hydraulic brake.

7. The speed control device of claim 1, wherein the processor determines that the mechanical braking is to be applied when the instructed speed indicates travelling at a constant speed after deceleration and the traveling speed is higher than the instructed speed, and performs control so that the mechanical braking is applied, due to the hydraulic brake.

8. The speed control device of claim 1, wherein
the processor controls operation of a lock based on the instructed speed and the traveling speed, the lock mechanically locking rotation of the driving wheel and keeping the driving wheel in a stopped state, and
the processor performs control of the lock so that rotation of the driving wheel is locked and the driving wheel is kept in the stopped state when the instructed speed indicates a stop and the traveling speed simultaneously indicates the stop.

9. A speed control method of an electromotive vehicle, comprising:
detecting a traveling speed of the electromotive vehicle from a speed sensor;
receiving an instructed speed based upon which an electric motor drives a driving wheel;
calculating a speed difference between the traveling speed detected from the speed sensor and the instructed speed;
determining whether only a braking force of regenerative braking, due to the electric motor, is sufficient to make the speed difference zero; and
controlling at least one of mechanical braking, due to a hydraulic brake, and the regenerative braking, due to the electric motor, based on a result of the determining,
wherein both the regenerative braking and the mechanical braking are applied so that the mechanical braking compensates for a deficit of the regenerative braking, when the braking force of the regenerative braking is not sufficient to make the speed difference zero.

* * * * *